(12) United States Patent
Yoshida

(10) Patent No.: US 7,683,857 B2
(45) Date of Patent: Mar. 23, 2010

(54) ILLUMINATOR, PROJECTION DISPLAY DEVICE AND METHOD FOR DRIVING THE SAME

(75) Inventor: Shohei Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1336 days.

(21) Appl. No.: 10/851,115

(22) Filed: May 24, 2004

(65) Prior Publication Data

US 2005/0017990 A1   Jan. 27, 2005

(30) Foreign Application Priority Data

May 30, 2003   (JP)   ............... 2003-154864

(51) Int. Cl.
*G09G 3/00* (2006.01)

(52) U.S. Cl. .............. 345/32; 345/31; 345/87; 345/204

(58) Field of Classification Search .......... 345/32, 345/31, 87, 204
See application file for complete search history.

(56) References Cited

U.S. PATENT DOCUMENTS

| | | | |
|---|---|---|---|
| 5,717,422 A | 2/1998 | Fergason | |
| 5,757,142 A * | 5/1998 | Kong | ............ 315/224 |
| 6,246,183 B1 * | 6/2001 | Buonavita | ............ 315/248 |
| 6,816,141 B1 | 11/2004 | Fergason | |
| 2003/0086265 A1 | 5/2003 | Iisaka et al. | |
| 2003/0184830 A1 * | 10/2003 | Takada | ............ 359/15 |
| 2003/0231260 A1 * | 12/2003 | Pate et al. | ............ 348/744 |

FOREIGN PATENT DOCUMENTS

| | | |
|---|---|---|
| EP | 1111578 A1 | 6/2001 |
| EP | 1383104 A | 1/2004 |
| JP | A 03-179886 | 8/1991 |
| JP | A 5-66501 | 3/1993 |
| JP | A 2003-121924 | 4/2003 |
| JP | A 2003-121926 | 4/2003 |
| JP | A 2003-131322 | 5/2003 |
| JP | A 2003-149730 | 5/2003 |
| JP | A 2003-149741 | 5/2003 |
| WO | WO 02/089106 A1 | 11/2002 |

* cited by examiner

*Primary Examiner*—Richard Hjerpe
*Assistant Examiner*—Leonid Shapiro
(74) *Attorney, Agent, or Firm*—Oliff & Berridge, PLC

(57) ABSTRACT

The invention provides a projection display device capable of appropriate light control depending on the kind of the image, the ambient brightness and so on, a method for driving the same, and an illuminator used in the same. The light flux of illumination can be adjusted on the basis of image information. The allowable light control range (dimming control) can be optimally set depending on the information (usage information) on the kind of viewed content, the brightness of viewing environment, the gain of a screen and the like.

9 Claims, 13 Drawing Sheets

FIG. 6

| $A_{11}$ | $A_{12}$ | $A_{13}$ | ... | ... | $A_{1n}$ |
|---|---|---|---|---|---|
| $A_{21}$ | ... | ... | | | |
| $A_{31}$ | ... | ... | | | |
| ⋮ | ... | ... | | | |
| ⋮ | ... | ... | | | |
| $A_{m1}$ | ... | ... | | | $A_{mn}$ |

(a)

(b)

(a)

(b)

(a)

(b)

ILLUMINATOR, PROJECTION DISPLAY DEVICE AND METHOD FOR DRIVING THE SAME

BACKGROUND OF THE INVENTION

1. Field of Invention

The present invention relates to an illuminator, a projection display device having the same, and a method for driving the same. More particularly, the invention relates to a projection display device having excellent image expression and an illuminator used therein.

2. Related Art

Information technology devices have greatly been developed, thus increasing a demand for display devices with high resolution, low power consumption, and low profile, and thus advancing research and development. Among them, liquid crystal displays are expected to be able to change optical characteristics by electrically controlling the alignment of liquid crystal molecules to thereby match the above-described needs. A known example of such liquid crystal displays is a projection display device (liquid crystal projector) that projects an image emitted from an optical system using a liquid-crystal light valve, on an enlarged scale, onto a screen through a projector lens.

The projection display device uses a liquid-crystal light valve as light modulation device. In addition, a digital micro mirror device (DMD) is also in practical use as light modulator. The conventional projection display devices of this type have the following problems:

Sufficient contrast cannot be provided because of light leakage and stray light occurring in various optical elements that construct the optical system, thus having a narrow display luminous range (dynamic range), and thus being inferior to existing TV monitors using a cathode ray tube (hereinafter, referred to as a CRT) in image quality and impression.

Even when an increase in image quality is intended by various image-signal processings, sufficient effects cannot be given because of the fixed dynamic range.

The solution to the problems of the projection display devices, briefly, the method for expanding the dynamic range, includes changing the intensity of light incident on the light modulation device (light valve) depending on the image signal. To that end, it is known in the art to provide light flux adjusting device (light control device) in front of a light source. See, for example, JP-A-05-066501.

As described above, the adaptive light control in which the light flux of illumination and the brightness of the display image are varied depending on the contents (for example, brightness) of the display image is effective in increasing the contrast or tone reproduction. However, it tends to cause deterioration of gradations and insufficient brightness in highlight areas. Therefore, it is effective for images having dark images as moving pictures, while it may not be effective for ones having light images as sportscasting, probably acting negatively by the occurrence of flickering.

The display characteristic of shadow areas is not so increased when the projection image is viewed in light environment that the contrast may be decreased because of insufficient brightness.

SUMMARY OF THE INVENTION

It is an object of the invention to provide a projection display device capable of appropriate light control depending on the kind of the image and the ambient brightness, or the like, a method for driving the same, and an illuminator used therein.

As described above, the adaptive light control is very effective in increasing image expression, however, the light control is always performed under the same condition without considering the device usage situation. Thus the light flux of illumination is excessively adjusted in some cases to apply a stress to viewers. Accordingly, the invention adopts the information on usage situation (usage information) as a light-control parameter and controls the light flux of a light source on the basis of the usage information.

In order to achieve the above objects, the illuminator according to the invention which is used to illuminate a light modulation device of a projection display device can include a light source, and a light control device that adjusts the light flux of the light source on the basis of image information and usage information.

The usage information can include, for example, the kind of an image, the brightness of viewing environment, screen gain, and user preferences. In this specification, the light flux of a light source is the ratio of the outputted light flux to a maximum light flux that the display device is able to irradiate. Similarly, an dimming amount is an dimming ratio relative to the maximum light flux.

The light control based on the usage information allows flexible light control in touch with reality. For example, when the usage information relates to the brightness of viewing environment, the dimming amount of the light source can be reduced when the ambient is bright, while the dimming amount is increased when the ambient is dark. Thus, the problem of insufficient brightness caused by excessive light control can be solved.

A method of actively varying the dimming amount depending on the usage information may be adopted as specific control method. A method of limiting the range in which dimming is allowed on the basis of the usage information may be adopted to facilitate light control. More specifically, the light control device may include light flux setting device for setting the light flux of the light source on the basis of image information and a dimming-range setting device for setting dimming range in which dimming is allowed on the basis of the usage information. The light control device adjusts the light flux of the light source on the basis of the set light flux and inhibits dimming exceeding the dimming range (briefly, the light control device adjusts the light flux within the dimming range).

With this arrangement, the dynamic range of the projection image can be expanded by appropriate adjustment of the light flux of illumination depending on the image information. Also the problem of insufficient brightness and the like can be solved without quality loss in image expression by limiting the dimming range of the light flux within a fixed range depending on the kind of the image and viewing environment. For example, when the viewing environment is bright or the image itself is bright and so light control works negatively, the dimming range is made narrower than normal (that is, the maximum allowable dimming amount is reduced), so that the problem of the insufficient brightness can be solved.

When the dimming amount of the set light flux exceeds the dimming range, the light flux control may be stopped. Alternatively, the light flux of the light source may be adjusted depending on the dimming amount within the dimming range.

The usage information may be inputted manually by a user or, alternatively, may be measured automatically by a sensor of the device.

The example of automatically measuring the usage information can include the structure in which the device has brightness measuring device for measuring the brightness of the projection-image viewing environment (for example, the brightness around the device and the brightness around the screen) and in which the dimming-range setting device sets the range on the basis of the brightness of the viewing environment. With this arrangement, for example, reducing the dimming range as the viewing environment becomes brighter (that is, the maximum allowable dimming amount is reduced) allows the entire image to be displayed more brightly than usual when the ambient is bright. Accordingly, high-quality projection images can be enjoyed without the feeling of insufficient brightness even in a bright room.

Another example is a structure in which the device has gain measuring means for measuring the gain of a projected-image display screen. The dimming-range setting device sets the dimming range on the basis of the gain. The tone reproduction effect by the light control increases as the contrast of the projection image increases. The contrast of the image varies depending on not only the performance of the display device itself but also on the projection screen. For example, with large screen gain, the contrast of the image is increased, while with small gain, the contrast is decreased. Accordingly, as in this arrangement, by adjusting the light control amount depending on the screen gain, the constant-quality projection images are provided constantly irrespective of the difference of the screens.

A projection display device according to the invention can include the illuminator, a light modulation device for modulating the light emitted from the illuminator to form image light, and a projection device for projecting the image light. With the arrangement, constant-quality images can be constantly provided to a user by proper light control depending on the usage situation.

Preferably, the projection display device further can include an image-signal expanding device for expanding the image signal on the basis of the dimming amount of the light source as the driving device. With the arrangement, first, an dimming range in which dimming is allowed is set by the dimming-range setting device on the basis of use information. The light flux of the light source is adjusted within the dimming range on the basis of the image signals per unit time (during a period), the image signals are expanded on the basis of the dimming amount of the light source, and the expanded image signals are sent to the light modulation means; thus, an image is formed. Accordingly, the dynamic range of the projection display device can be expanded to realize a projection display device with high image expression and adaptability to usage environment.

In this case, preferably, when the dimming amount of the light flux which is set by the light flux setting device is within the dimming range, the image-signal expanding device expands the image signal by an expansion amount that is the complement of the light flux, whereas when the dimming amount of the set light flux is out of the dimming range, the image-signal expanding device expands the image signal by an expansion amount larger than the reciprocal.

With the conventional light control in which the dimming amount is not limited, the light flux of the light source is always adjusted with a set dimming amount. Therefore, the product of the expansion amount and the light flux needs to be set to one or less to make the expanded image signal equal to or less than the maximum displayable gray level. On the other hand, with the light control in which the dimming is limited to be lower than a certain value, as in the invention, the signal that has the maximum gray level of the image signals is not expanded to the maximum displayable gray level even by the conventional expanding process based on the limited dimming amount (the process in which the product of the expansion amount and the light flux becomes one or less). In other words, when the set dimming amount comes out of the dimming range, there is some margin of gray levels in a high gray-level region even if expanding process is performed under the condition that the product of the expansion amount and the light flux is one, so that sufficient tone reproduction is not obtained. Accordingly, setting the product of the expansion amount and the light flux higher than one with the dimming limited, as in this arrangement, a decrease in tone reproduction can be prevented.

BRIEF DESCRIPTION OF THE DRAWINGS

The invention will be described with reference to the accompanying drawings, wherein like numerals reference like elements, and wherein:

FIG. 6 is an explanatory diagram of a third method of the same;

DETAILED DESCRIPTION OF PREFERRED EMBODIMENTS

Referring to FIGS. 1 to 8, a projection display device according to a first embodiment of the invention will now be described.

The projection display device of the embodiment is a three-light-valve-liquid-crystal projection display device including a transmissive liquid-crystal light valve for each of different colors of red (R), green (G), and blue (B).

Figure 1:
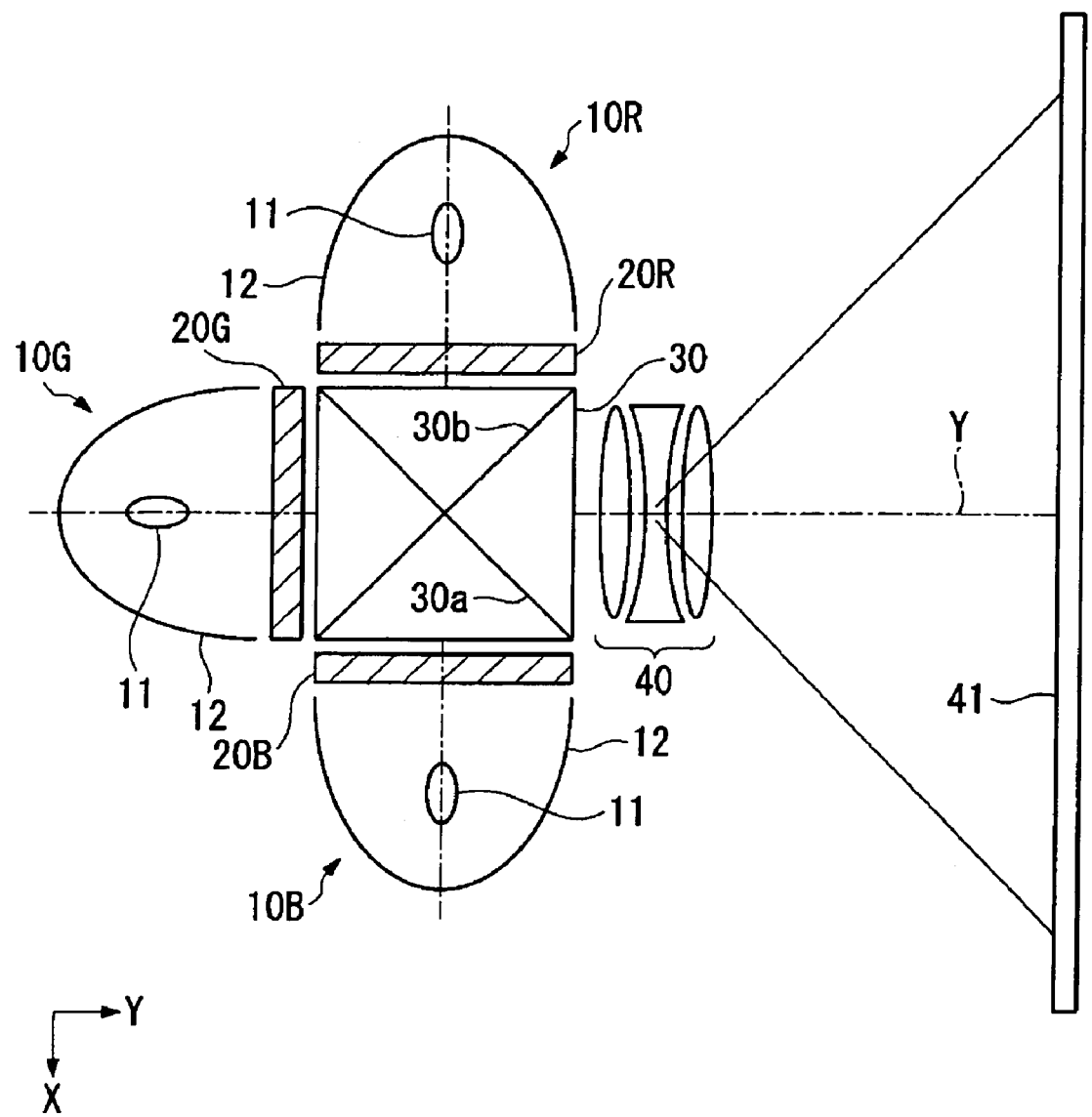
FIG. 1 is a schematic diagram of a projection display device according to a first embodiment of the invention.

FIG. 1 shows the schematic arrangement of the projection display device, wherein reference numerals 10R, 10G, and 10B denote three light sources constructing an illuminator of the invention, respectively, reference numerals 20R, 20G, and 20B denote liquid-crystal light valves (light modulation device), numeral 30 denotes a cross-dichroic prism, numeral 40 denotes a projector lens (projection device), and numeral 41 denotes a screen.

The light sources 10R, 10G, and 10B are color light sources capable of emitting red light, green light, and blue light, respectively, wherein the respective light sources 10 (10R, 10G, 10B) includes a light emitter 11, such as a light-emitting diode (LED), an organic electroluminescence element (organic EL element), and an inorganic electroluminescence element (inorganic EL element) and a reflector 12 for reflecting the light from the light emitter 11. The light valves 20R, 20G, and 20B are arranged to correspond to the light sources 10R, 10G, and 10B, respectively, being capable of light modulation for each light source.

The cross-dichroic prism 30 has a structure in which four rectangular prisms are bonded together, having a light reflective film (not shown) formed of a dielectric multilayer film in cross shape on the bonded surfaces 30a and 30b. More specifically, the bonded surface 30a has a light reflective film that reflects red image light formed by the light modulator 20R and transmits green and blue image lights formed by the light modulators 20G and 20B, respectively. On the other hand, the bonded surface 30b has a light reflective film that reflects blue image light formed by the light modulator 20B and transmits red and green image lights formed by the light modulators 20R and 20G, respectively. With the light reflective films, the respective color image light rays formed by the liquid-crystal light valves 20R to 20B are combined to form light representing a color image. The combined light is projected onto the screen 41 through the projector lens 40 which is a projection optical system to display an enlarged image.

A method for driving the projection display device of the embodiment will now be described.

Figure 2:
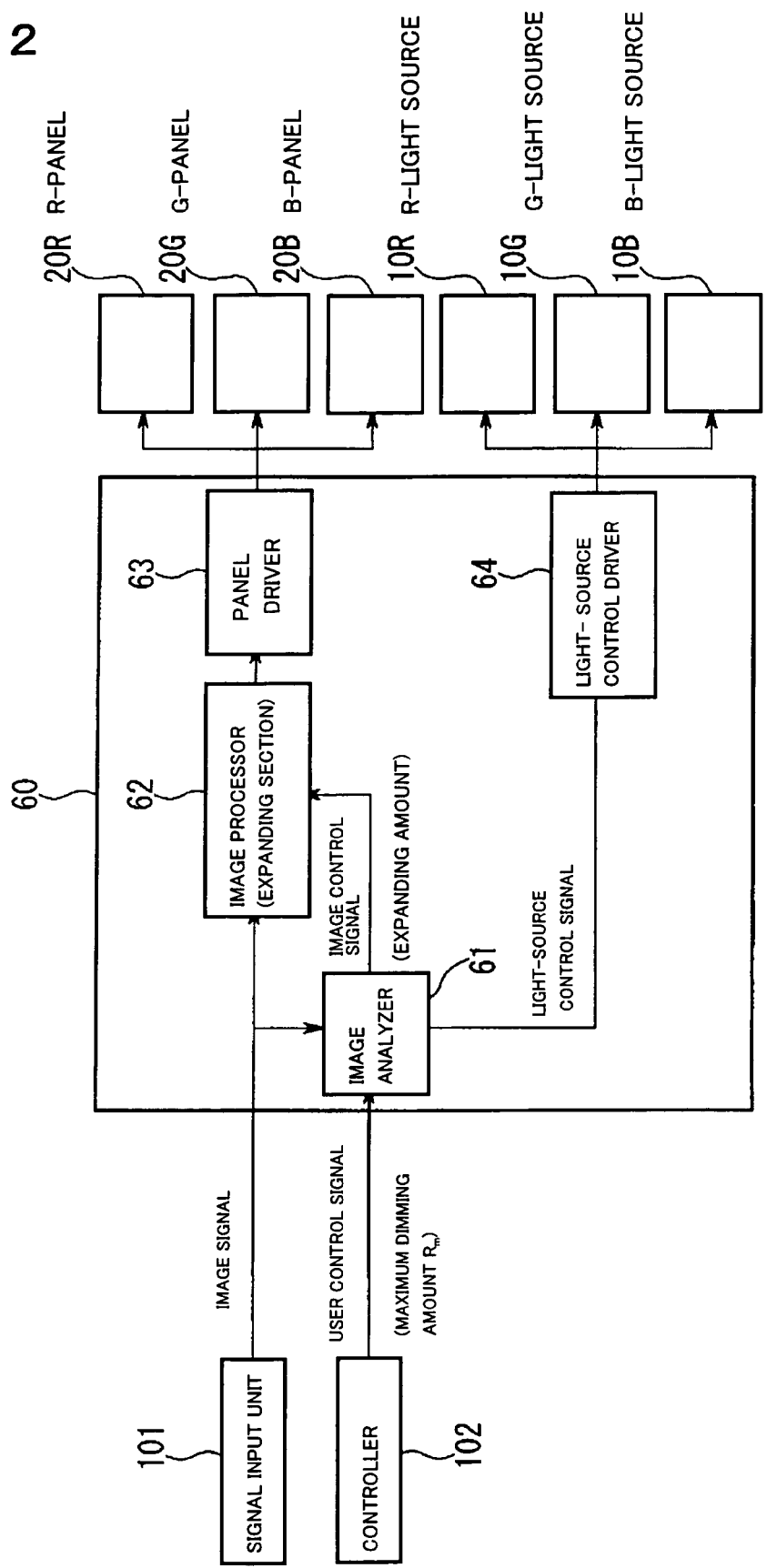
FIG. 2 is an exemplary block diagram of a configuration of a controller of the projection display device of the same.

FIG. 2 is an exemplary block diagram showing the configuration of a controller 60 of the projection display device of the embodiment. The embodiment is constructed to adjust the light flux of the light source on the basis of both image information and information (usage information) on the usage situation of the device. Accordingly, the projection display device of the embodiment includes a signal input unit 101 for inputting a image signal as an external input unit and a controller 102 (usage-information input device) for setting dimming range of the light source depending on the kind of a viewed image, ambient brightness, user preferences.

With the controller 102, the dimming range is designated on the basis of, for example, the maximum allowable dimming amount (the maximum dimming amount) $R_m$. The method of designation may be either a method in which a user directly inputs the maximum dimming amount $R_m$ numerically or a method in which a user selects it from the dimming range displayed on a menu screen. The latter example includes a structure in which the menu includes "normal," "dynamic," "sports," and "no light control" and their maximum dimming amounts are 50%, 75%, 25%, and 0%, respectively. When the maximum dimming amount $R_m$ is designated, the dimming amount of the dimming range is set equal to or smaller than the maximum dimming amount $R_m$ (or, the dimming amount is within the range of 0 to $R_m$). The information on the dimming range is inputted as a user control signal to the controller 60.

The controller 60 can include an image analyzer (light control means) 61 for setting the light flux T of each of the light sources 10R, 10G, and 10B and the expansion amount $P_0$ of the respective color image signals on the basis of the image signal and the user control signal, a light-source control driver 64 for driving the light sources 10R, 10G, and 10B on the basis of the light flux T set by the image analyzer 61, an image processor (image signal expansion device) 62 for expanding the respective color image signals on the basis of the set expansion amount $P_0$, and a panel driver 63 for sending the expanded color image signals to the red-light liquid-crystal light valve 30R (R-panel in FIG. 5), the green-light liquid-crystal light valve 30G (G-panel in the same), and the blue-light liquid-crystal light valve 30B (B-panel in the same).

Figure 3:
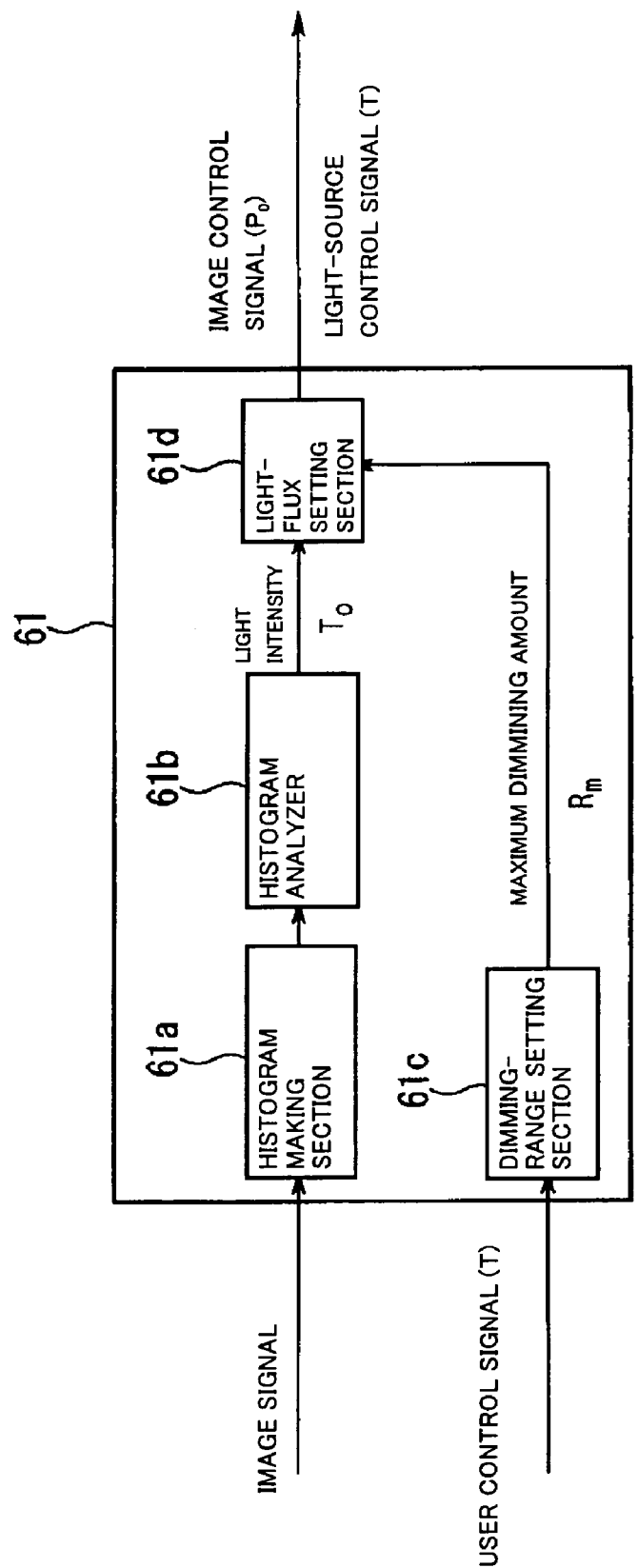
FIG. 3 is an exemplary block diagram of an essential part of the controller of the same.

Referring to FIG. 3, the image analyzer 61 includes a histogram making section 61a, a histogram analyzer 61b, an dimming-range setting section 61c, and a light flux setting section 61d. In the image analyzer 61, when image signals are inputted from the signal input unit 101, the histogram-making section 61a makes a pixel data distribution (histogram) for each gray level, contained in the signals per unit time (for one frame). The histogram analyzer 61b determines the brightness of the image on the basis of the histogram to set the light flux of the light sources 10R, 10G, and 10B. Briefly, the histogram analyzer 61b functions as a light flux setting device of the invention.

A method for measuring the brightness using the histogram will now be described. The method includes, for example, the following three methods:

(a) A method of measuring the brightest gray level of the pixel data contained in the target frame as the brightness of the image.

Figure 4:
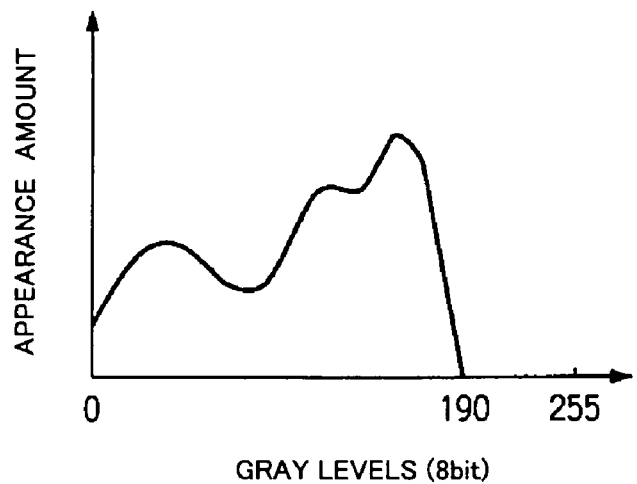
FIG. 4 is an explanatory diagram of a first method for determining a light-source control signal based on a image signal in the projection display device of the same.

Suppose an image signal containing 256 steps of gray levels from 0 to 255. For an arbitrary one frame that constructs continuous images, assume that a pixel data distribution (histogram) contained in the frame for each gray level is obtained as shown in FIG. 4. In this case, the brightest gray level in the histogram is 190; thus, the 190 levels of gray are the brightness of the image. The method is one in which the brightness can be expressed most faithfully for the inputted image signals.

(b) A method of measuring the gray level of a certain ratio (for example, 10 percent of a image) to the brightest level in the distribution (histogram) for each gray level contained in a target frame, as the brightness of the image.

Figure 5:
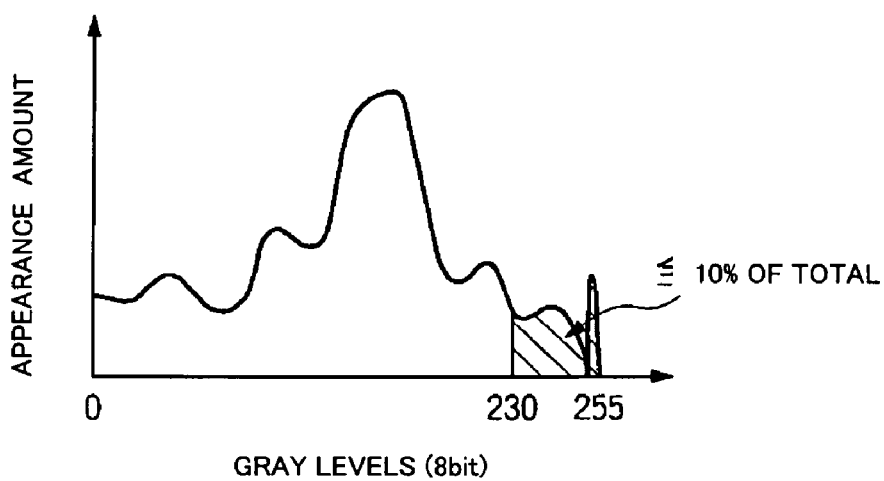
FIG. 5 is an explanatory diagram of a second method of the same.

When the image-signal distribution is as shown in FIG. 5, 10-percent-area from the brightest level is taken in the histogram. Assuming that the gray level of the area corresponding to 10 percent is 230, the 230 levels of gray are determined as a light-control signal. When there is a sharp peak near level 255, as in the histogram of FIG. 5, the level 255 is determined as a light-control signal by the above-described method (a). The sharp peak, however, does not make sense as information on the entire screen. On the other hand, the method of determining the 230 levels of gray as the brightness of the image can be referred to as a method of measuring the brightness with a significant area in the entire screen as information. The ratio may be varied in the range on the order of 0.1 to 50 percent.

(c) A method of dividing the image into a plurality of areas and obtaining the mean value of the gray levels of the pixels contained in each area, of which the maximum one is taken as the brightness of the image.

Figure 6:
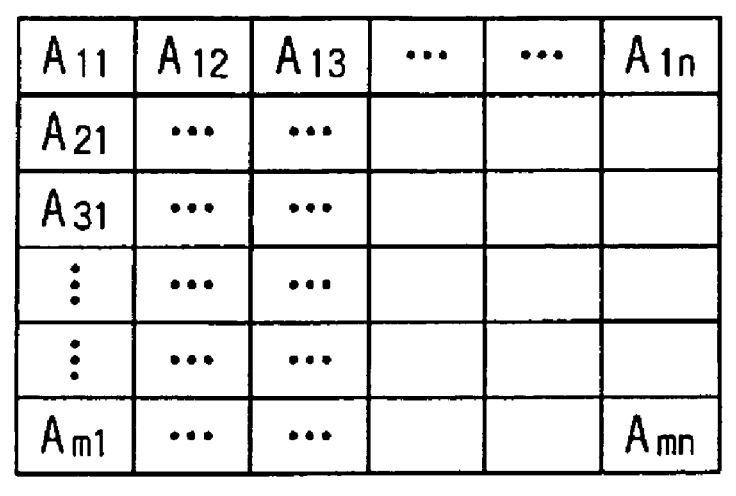

Referring to FIG. 6, for example, the screen is divided into m×n areas, and the mean value of the brightness (the number of gray levels) for each of the blocks $A_{11}$ to $A_{mn}$ is calculated, of which the maximum one is taken as the brightness of the image. The number of divisions of the screen is desirably on the order of 6 to 200. The method is capable of controlling the brightness without loss of the atmosphere of the entire screen.

With the above methods (a) to (c), the determination of the brightness of the image may be made for a specific part, such as the center of the display region, instead of being made for the entire display region. This allows the control in which the brightness is determined from the part to which a viewer's attention is being given.

Suppose that the number of gray levels 190 is measured as the brightness of the image in this way. Letting the light flux (the maximum light flux) of the maximum brightness (for example, 255 levels of gray) be 100 percent, 190/255=75% is temporarily set as the light flux $T_0$ of the light source when the display gamma characteristic is 1.0.

The dimming-range setting section (dimming-range setting means) 61c sets a range in which dimming is allowed (dimming range) on the basis of the user control signal.

The set light flux $T_0$ and the dimming range are inputted to the light flux setting section 61d, where a light flux T which is used for actual light-source control is determined. More specifically, when the dimming amount of the temporarily set light flux $T_0$ is within the dimming range (that is, equal to or lower than the maximum dimming amount $R_m$), the light flux setting section 61d uses the temporarily set light flux $T_0$ as the actual light flux T. On the other hand, when the dimming amount of the temporarily set light flux $T_0$ is out of the dimming range (that is, larger than the maximum dimming amount $R_m$), the light flux setting section 61d sets the actual light flux T to a light flux that is obtained by attenuating light from the maximum light flux by an dimming amount (dimming amount of 0 to $R_m$) within the dimming range. In this embodiment, for example, the light flux that is obtained by attenuating light from the maximum light flux by the maximum dimming amount $R_m$ is set as the actual light flux T. The light flux T which is set in this way is outputted as a light-source control signal to a light-source control driver 64. The light-source control driver 64 controls the light flux and the period of light emission of the light sources 10R to 10B in accordance with the light-source control signal to thereby adjust the light flux.

The light flux setting section 61d can also set the expansion amount $P_0$ of the image signal depending on the actual light flux T. More specifically, when the dimming amount of the temporarily set light flux $T_0$ is within the dimming range, the reciprocal (1/T) of the light flux T is set as the expansion amount $P_0$. On the other hand, when the dimming amount of the temporarily set light flux $T_0$ is out of the dimming range, the expansion amount $P_0$ is set larger than the reciprocal (1/T) of the light flux T. The expansion amount $P_0$ which is set in this way is outputted as an image control signal to the image processor 62.

Figure 7:
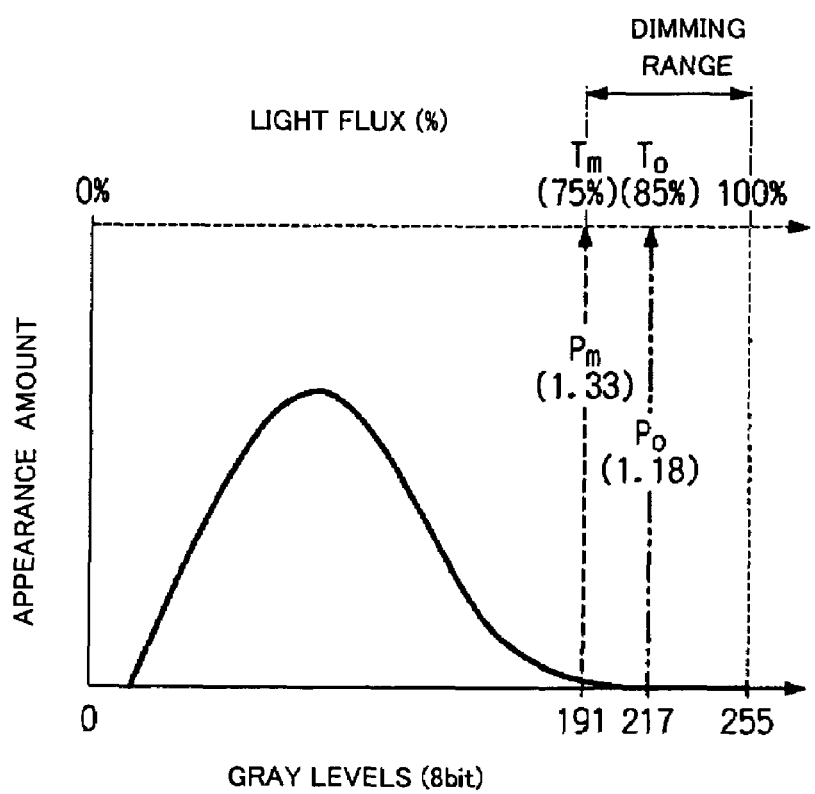
FIG. 7 is an explanatory diagram of a method for determining an image control signal based on a light-source control signal in the projection display device of the same.
Figure 7:
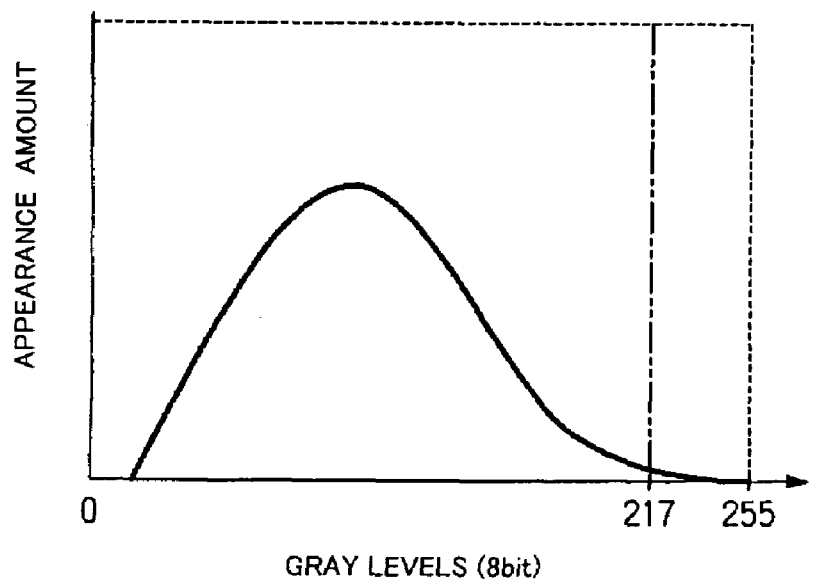
Figure 8:
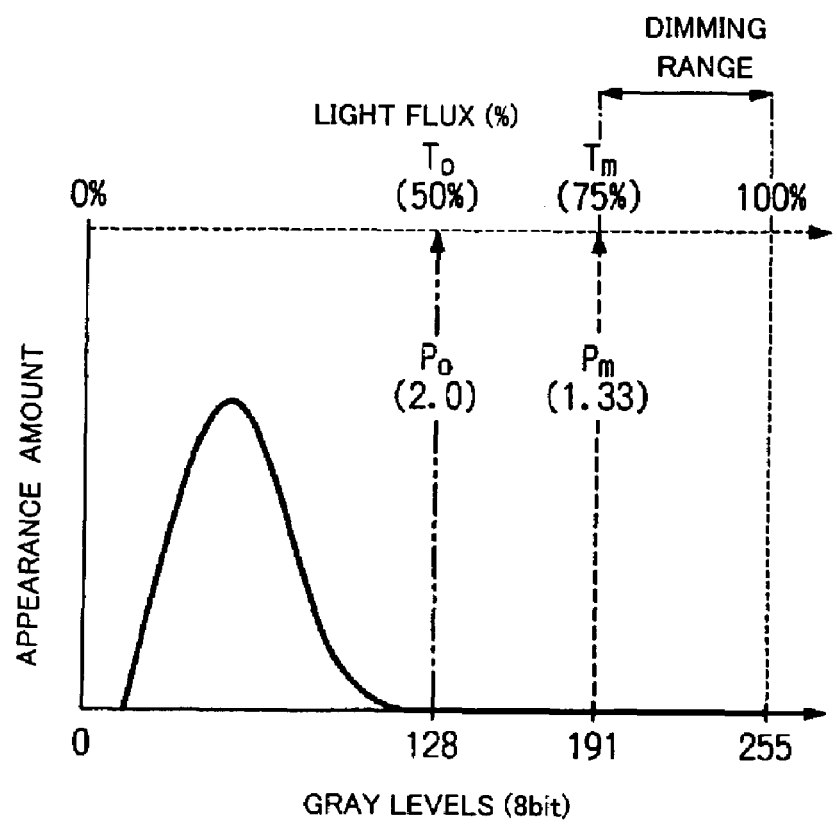
FIG. 8 is an explanatory diagram of a method for determining an image control signal of the same.
Figure 8:
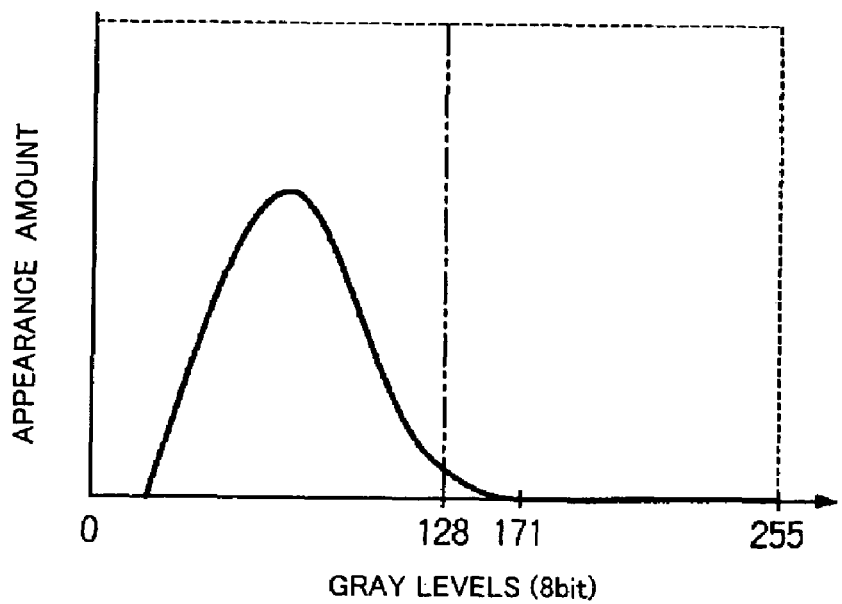

FIGS. 7 and 8 show examples of expansion processing in the case in which the maximum dimming amount $R_m$ is set to 25 percent (i.e., the dimming range is set to a range where the dimming amount is from 0 to 25 percent) and the brightness of the image is obtained as the brightest gray level in the histogram. In FIGS. 7 and 8, the light flux and the expansion amount in the case where the light of the light source is attenuated by the maximum dimming amount $R_m$ are indicated by $T_m$ and $P_m$, respectively.

Suppose that the histogram of the pixel data in one frame plotted against the number of gray levels is as in FIG. 7(a). The brightest gray level in the histogram is 217, thus, the brightness of the image is the 217 levels, in which case the temporarily set light flux $T_0$ is 217/255=85%. Since the dimming amount of the temporarily set light flux $T_0$ is within the dimming range, the light flux $T_0$ is used for the light flux T outputted as a light-source control signal. The expansion amount $P_0$ is set to $1/T_0$=1.18 using the light flux $T_0$. The image signals of 0 to 217 levels of gray are expanded to 0 to 255 levels of gray by the expansion processing by the image processor 62 (refer to FIG. 7(b)).

Suppose that the histogram is as in FIG. 8(a). The brightest gray level in the histogram is 128, thus, the brightness of the image is the 128 level, in which case the temporarily set light flux $T_0$ is 128/255=50%.

Since the dimming amount of the light flux $T_0$ is out of the dimming range, the light flux T outputted as the light-source control signal is a light flux obtained by attenuating light from the maximum light flux by the maximum dimming amount $R_m$. The expansion amount $P_0$ is set to $1/(1-R_m)=P_m$=1.33 using the maximum dimming amount $R_m$ for example. The image signals of 0 to 128 level of gray are expanded to 0 to 171 levels of gray by the expansion processing by the image processor 62 (refer to FIG. 8(b)).

Figure 9:
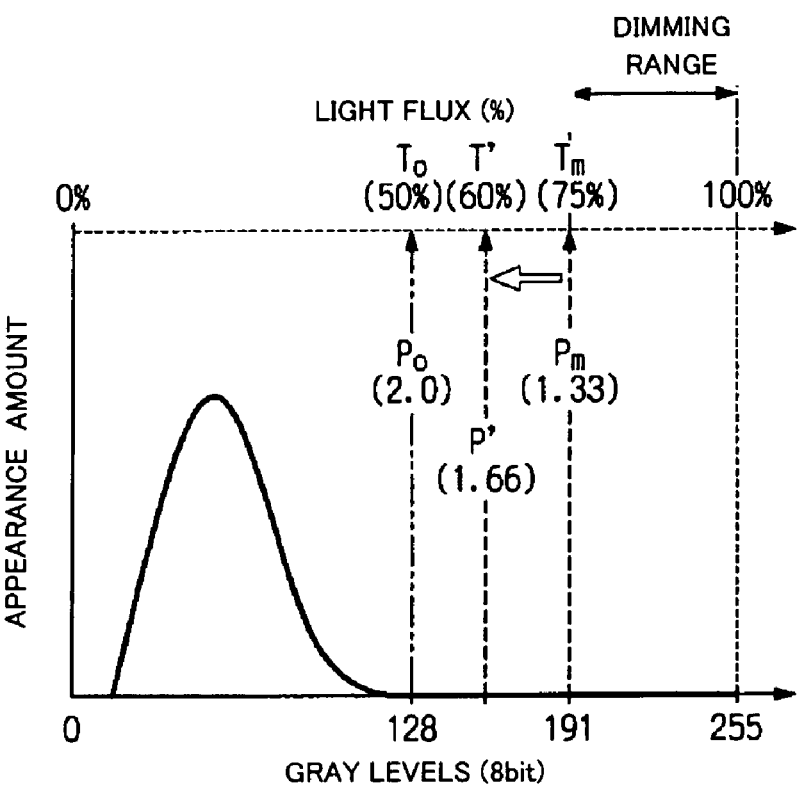
FIG. 9 is an explanatory diagram of a method for determining an image control signal of the same.
Figure 9:
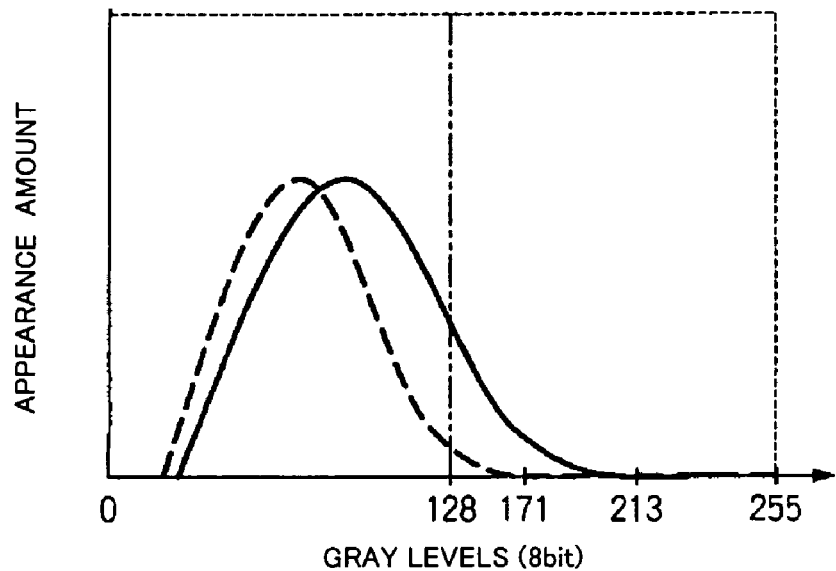

When the expansion amount is set as above, however, the number of gray levels after the expansion, even of pixel data in which the gray levels is the maximum in the image signals, becomes smaller than the maximum displayable gray level (255 level). In other words, according to this setting method, there occur remaining gray levels in a high gray-level region, not providing sufficient tone reproduction. To solve the problem, as shown in FIG. 9(a), the expansion amount may be set to a value P' larger than $P_m$ and smaller than $P_0$. FIG. 9(a) shows an example of setting the expansion amount P' at 1.66 while the light flux T is maintained. In this case, since the image signals from 0 to 128 levels of gray are expanded to 0 to 213 levels of gray by the expansion processing by the image processor 62, the problem of the remaining gray levels is relieved (refer to FIG. 9(b)). In this case, the dimming amount remains $R_m$. Consequently, the entire image becomes bright, thereby providing a display more suitable for usage situation.

As described above, this embodiment incorporates the information on the device usage situation for light control. Accordingly, the dimming amount of the light source can be adjusted optimally depending on the kind of the images and the brightness of the viewing environment, allowing flexible light control in touch with reality. For example, the embodiment limits the dimming amount of the light source on the basis of the usage information. Thus, the dynamic range of the projection image can be expanded by appropriate adjustment of the light flux of illumination depending on the image information. Also the problem of insufficient brightness and the like can be solved without quality loss in image expression by limiting the dimming range of light flux within a fixed range depending on the kind of the image and the viewing environment.

The method for light control in view of the device usage situation can include a method of actively varying the dimming amount of the light source depending on the usage information, in addition to the method of the embodiment.

The device usage situation, however, does not vary greatly during image display. Accordingly, also the static control system in which the dimming amount of the light source is limited on the basis of the usage information, as in this embodiment, offers the above-described effects sufficiently, and being advantageous in cost because of easy control.

Figure 10:
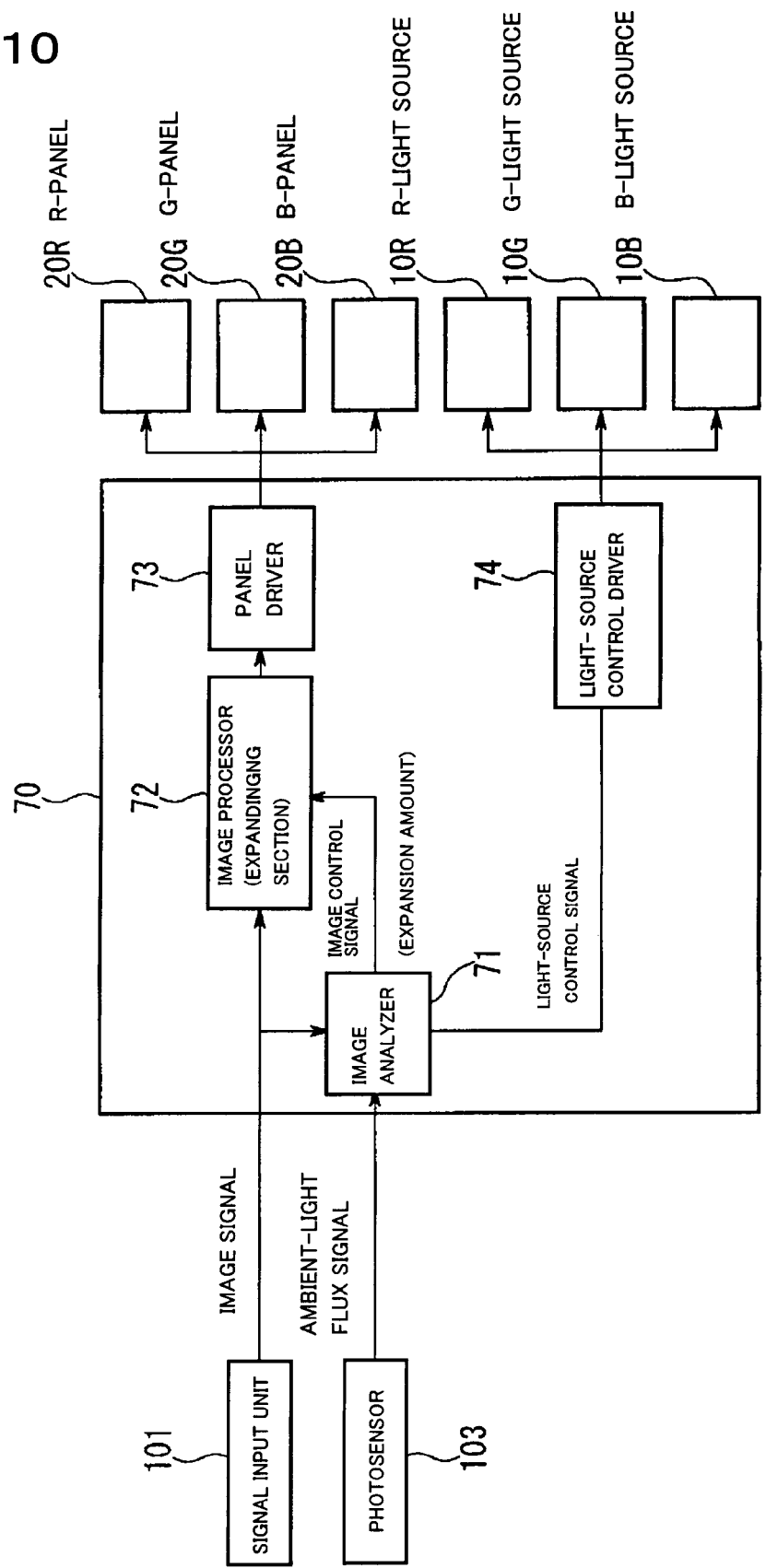
FIG. 10 is an exemplary block diagram of a controller of a projection display device according to a second embodiment of the invention.
Figure 11:
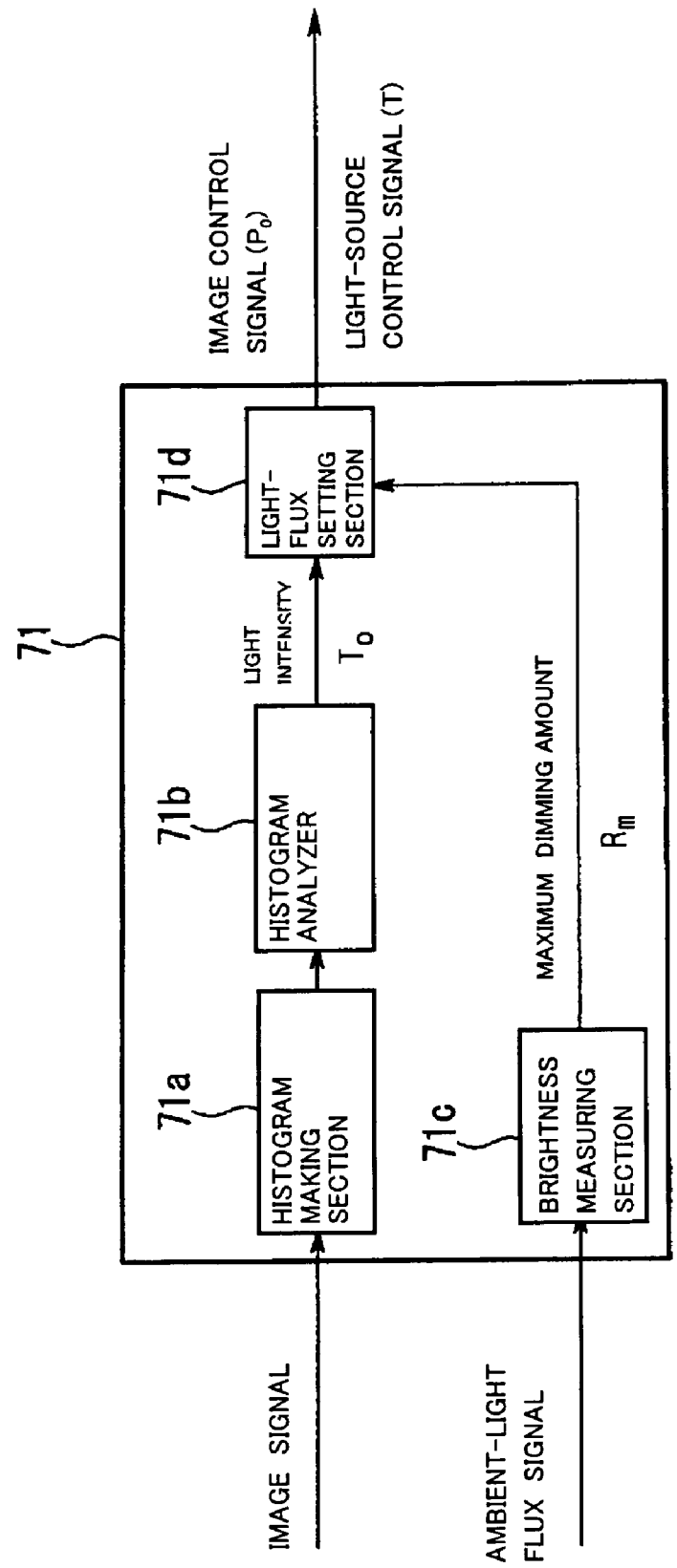
FIG. 11 is an exemplary block diagram of an essential part of the controller of the same.

Referring now to FIGS. 10 and 11, a projection display device according to a second embodiment of the invention will be described. In this embodiment, the same components as those of the first embodiment are given the same reference numerals and their description will be omitted.

FIG. 10 is an exemplary block diagram of the arrangement of a controller 70 of the projection display device according to this embodiment. The embodiment is constructed to measure the ambient brightness as usage information and to automatically set an dimming range depending on the brightness. Specifically, the embodiment can include a photosensor (usage-information input means) 103 for measuring the brightness of viewing environment, in addition to the signal input unit 101 for inputting a image signal as an external input unit. The environmental brightness measured by the photosensor 103 may be either the brightness in the vicinity of the projection display device or the brightness in the vicinity of a screen. The information of the brightness of the viewing environment is inputted to the controller 70 as an ambient-light flux signal.

The controller 70 can include an image analyzer (light control means) 71 for setting the light flux T of the light sources 10R to 10B and the expansion amounts $P_0$ of the color image signals on the basis of the image signals and the ambient-light flux signal, a light-source control driver 74 for driving the light sources 10R to 10B on the basis of the light flux adjusted amount set by the image analyzer 71, an image processor (image-signal expanding means) 72 for expanding the color image signals on the basis of the set expansion amount $P_0$, and a panel driver 73 for sending the expanded color image signals to the red-light liquid-crystal light valve 30R (the R-panel in FIG. 5), the green-light liquid-crystal light valve 30G (the G-panel in the same), and the blue-light liquid-crystal light valve 30B (the B-panel in the same), respectively.

Referring now to FIG. 11, the image analyzer 71 can include a histogram forming section 71a, a histogram analyzer 71b, a brightness measuring section 71c, and a light flux setting section 71d.

In the image analyzer 71, when image signals are inputted from the signal input unit 101, the histogram forming section 71a forms a pixel data distribution (histogram) for each gray level, contained in the signals per unit time (for one frame). The histogram analyzer 71b measures the brightness of the image on the basis of the histogram to set the light flux of the light sources 10R to 10B. Briefly, the histogram analyzer 71b functions as light flux setting means of the invention. The method of measuring the brightness using the histogram and the method of setting the light flux $T_0$ by the histogram analyzer 71b may be the same as those of the first embodiment.

Figure 12:
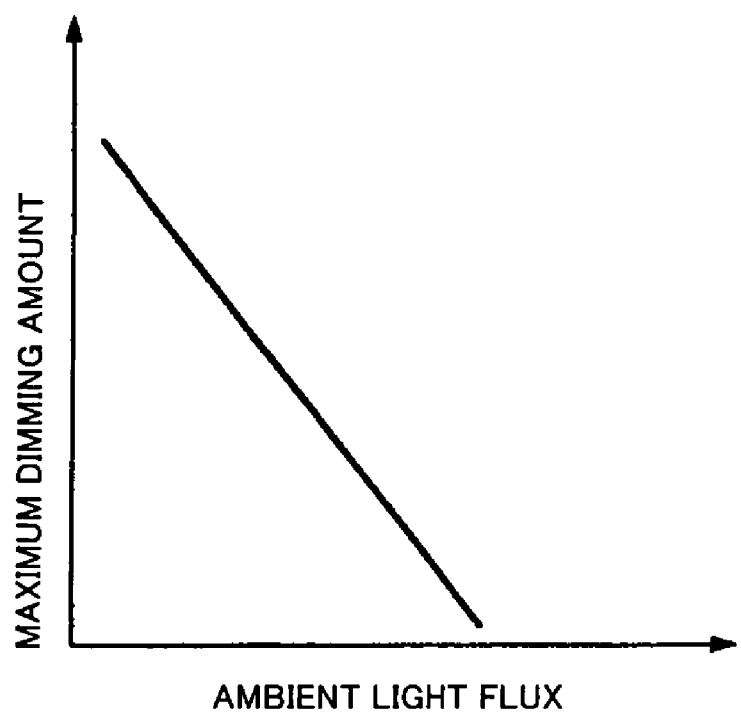
FIG. 12 is an explanatory diagram of a method for determining a maximum dimming amount based on ambient-light flux signal in the projection display device of the same.

The brightness measuring section 71c sets a range in which dimming is allowed (dimming range) on the basis of an ambient-light flux signal with reference to a look-up table (LUT). The LUT is a control table that specifies the relationship between the brightness of viewing environment (ambient light flux) and the maximum allowable dimming amount (the maximum dimming amount) $R_m$, in which the dimming range is set as a range where the dimming amount is equal to or lower than the maximum dimming amount $R_m$. In the LUT, as shown in FIG. 12, the higher the ambient light flux is, the lower the maximum dimming amount $R_m$ is specified, when the viewing environment is bright, the dimming range is narrowed. In other words, the brightness measuring section 71c functions as a brightness measuring device and a dimming-range setting device of the invention.

The set light flux $T_0$ and the dimming range are inputted to the light flux setting section 71d, where the light flux T which is used for actual light-source control and the expansion amount $P_0$ of the image signal are determined. The method of setting the light flux T and the expansion amount $P_0$ may be the same as that of the first embodiment.

In this embodiment, accordingly, when the ambient light flux is high, an entire image is displayed more brightly than usual, allowing high-quality projection images to be enjoyed without the feeling of insufficient brightness even in a bright room.

Figure 13:
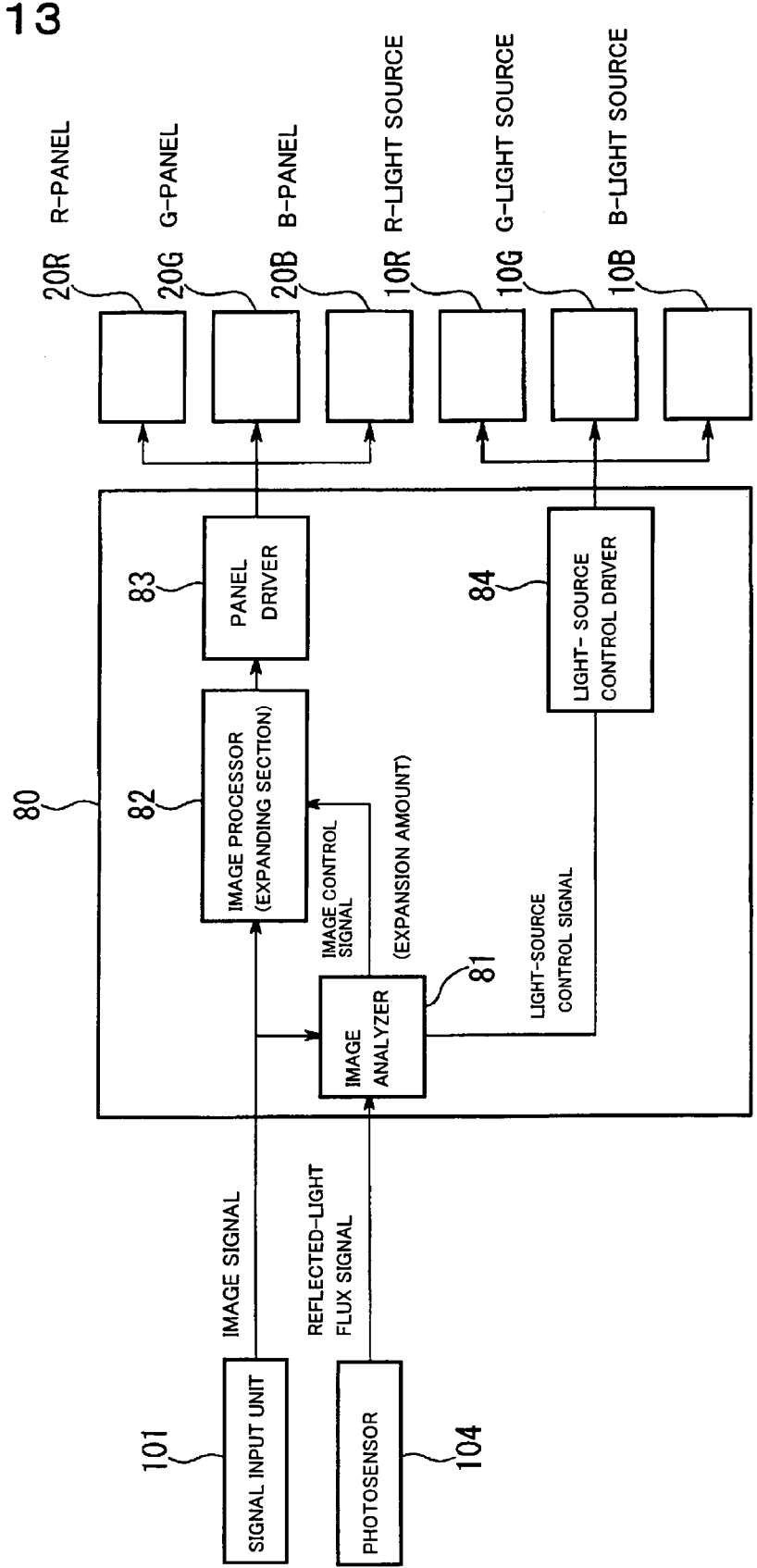
FIG. 13 is an exemplary block diagram of a controller of a projection display device according to a third embodiment of the invention.
Figure 14:
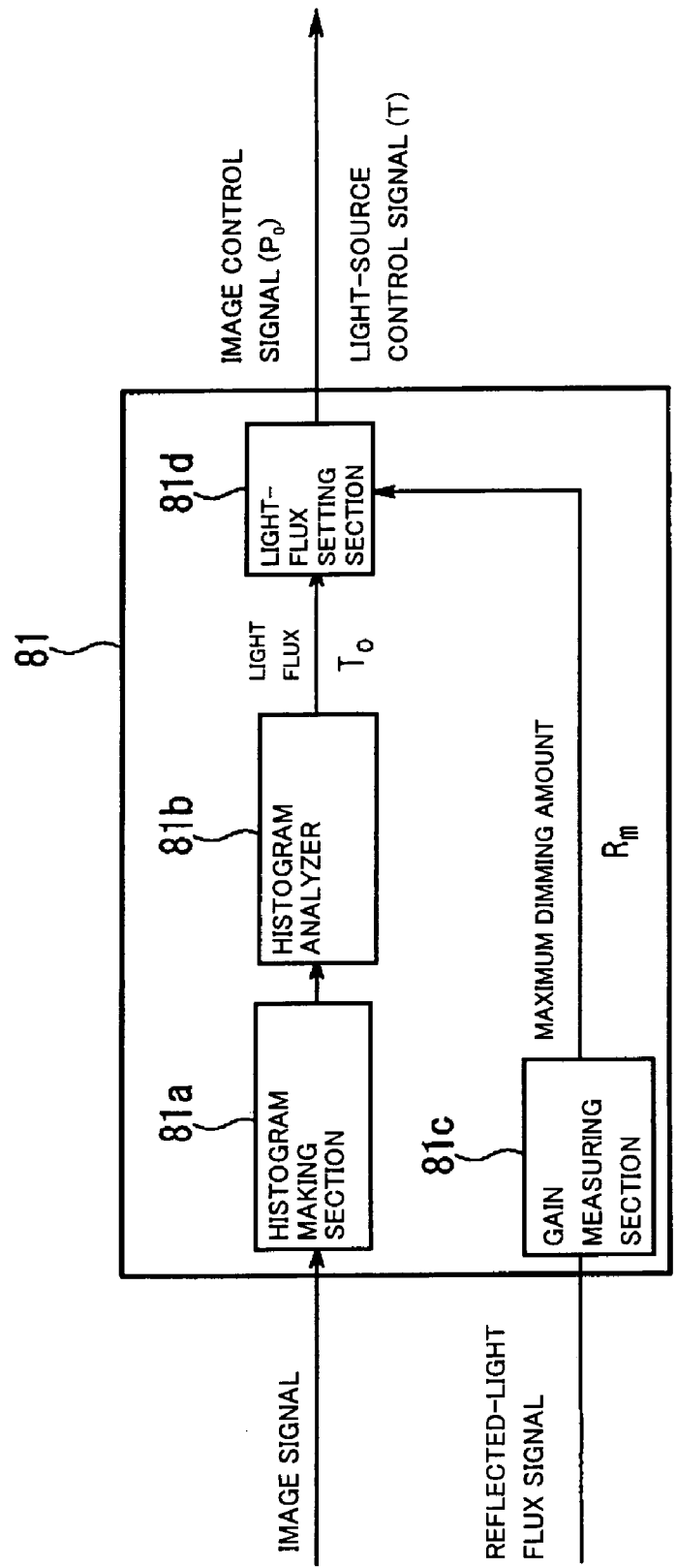
FIG. 14 is an exemplary block diagram of an essential part of the controller of the same.

Referring now to FIGS. 13 and 14, a projection display device according to a third embodiment of the invention will be described. In this embodiment, the same components as those of the first embodiment are given the same reference numerals and their description will be omitted.

FIG. 13 is an exemplary block diagram of the arrangement of a controller 80 of the projection display device according to this embodiment. The embodiment is constructed to measure screen gain as ambient light flux and to automatically set an dimming range depending on the screen gain. Specifically, the embodiment can include a photosensor (usage-information input means) 104 for measuring the reflected light flux from the screen, in addition to the signal input unit 101 for inputting an image signal as an external input unit. For example, the entire white image is displayed on the screen before image display and the reflected light flux of the image is measured by the photosensor 104. The information on the reflected light flux from the screen, measured by the photosensor 104, is inputted to the controller 80 as a reflected-light flux signal.

The controller 80 includes an image analyzer (light control means) 81 for setting the light flux T of the light sources 10R to 10B and the expansion amounts $P_0$ of the color image signals on the basis of the image signals and the reflected-light flux signal, a light-source control driver 84 for driving the light sources 10R to 10B on the basis of the light flux adjusted amount set by the image analyzer 81, an image processor (image-signal expanding means) 82 for expanding the color image signals on the basis of the set expansion amount $P_0$, and a panel driver 83 for sending the expanded color image signals to the red-light liquid-crystal light valve 30R (the R-panel in FIG. 5), the green-light liquid-crystal light valve 30G (the G-panel in the same), and the blue-light liquid-crystal light valve 30B (the B-panel in the same), respectively.

Referring now to FIG. 14, the image analyzer 81 can include a histogram forming section 81a, a histogram analyzer 81b, a gain measuring section 81c, and a light flux setting section 81d.

In the image analyzer 81, when image signals are inputted from the signal input unit 101, the histogram forming section 81a forms a pixel data distribution (histogram) for each gray level, contained in the signals per unit time (for one frame). The histogram analyzer 81b measures the brightness of the image on the basis of the histogram to set the light flux of the light sources 10R to 10B. Briefly, the histogram analyzer 81b functions as light flux setting means of the invention. The method of measuring the brightness using the histogram and the method of setting the light flux $T_0$ by the histogram analyzer 81b may be the same as those of the first embodiment.

The gain measuring section 81c measures the screen gain in accordance with the reflected-light flux signal and sets a range in which dimming is allowed (dimming range) on the basis of the screen gain with reference to a look-up table (LUT). The LUT is a control table that specifies the relationship between the screen gain and the maximum allowable dimming amount (the maximum dimming amount) $R_m$. In the LUT, the larger screen gain is, the larger the maximum dimming amount $R_m$ is specified. The dimming range is narrowed in the state in which the contrast is displayed low. The dimming range is set as a range where the dimming amount is equal to or smaller than the maximum dimming amount $R_m$. In other words, the gain measuring section 81c functions as a gain measuring device and a dimming-range setting device of the invention.

The set light flux $T_0$ and the dimming range are inputted to the light flux setting section 81d, where the light flux T which is used for actual light-source control and the expansion amount $P_0$ of the image signal are determined. The method of setting the light flux T and the expansion amount $P_0$ may be the same as that of the first embodiment.

In this embodiment, accordingly, the larger the screen gain is, the larger the dimming amount is, thus preventing a decrease in image quality due to the difference of screens. In other words, the higher the contrast of the projection image is, the larger the tone reproduction effects by light control are. The contrast of the image varies depending on not only the performance of the display device itself but also on the projection screen. For example, with large screen gain, the contrast of the image is high, while with small gain, the contrast is low. Accordingly, by controlling the light control depending on the screen gain, as in this arrangement, uniform-quality projection images are provided constantly irrespective of the difference of the screens.

It should be understood that the technical scope of the invention is not limited to that of the above embodiments, and various modifications may be made without departing from the spirit and scope of the invention.

For example, the embodiments include three color light sources made of LEDs or the like and control respective light intensities and periods of light emission to thereby adjust the light flux. Instead, a light control device, which is constructed of a douser, a liquid crystal device and so on, may be provided on the optical axis of the light emitted from each light source, with which the light flux of the emission light from the light source may be reduced to adjust the light flux. Specifically, the light flux of emission light can be adjusted by adjusting the light transmission of the liquid crystal device, the period of light transmission of the liquid crystal device, the movement of the douser, and the period of the movement of the douser.

The arrangement of the projection display device of FIG. 1 is merely an example and other arrangements may be adopted. More specifically, the projection display device may include a light source, a color separation device for separating the light emitted from the light source into a plurality of color lights, a light modulation device provided corresponding to the divided colors, a light combining device for combining the color lights modulated by the light modulation device, and a projection device for projecting the light combined by the color combining device. In this case, the light flux is adjusted by directly controlling the light source or, alternatively, by providing a light control device between the light source and the light modulation device or on the side of the light emission of the light modulation device.

Although the embodiments have been described taking a projection display device using a liquid crystal light valve as a light modulation device as an example, it should be understood that the invention may be applied to a projection display device using a DMD as a light modulation device.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An illuminator used to illuminate a light modulation device of a projection display device, comprising:
   a light source;
   a light control device that adjusts an amount of a light flux of the light source on the basis of image information and usage information,
   the light control device including a light flux setting device that sets the amount of light flux of the light source on the basis of image information and a dimming-range setting device that sets a dimming range in which dimming is allowed on the basis of the usage information; and
   an image-signal expanding device that expands an image signal on the basis of a dimming amount of the light source, wherein
   the light control device adjusts the amount of light flux of the light source on the basis of the amount of light flux set by the light flux setting device within the dimming range, and
   the light flux setting device temporarily sets a temporary amount of the light flux, when a dimming amount of the temporary amount of the light flux is within the dimming range, the image-signal expanding device expands the image signal by an expansion coefficient that is a reciprocal of the temporary amount of light flux, whereas when the dimming amount of the temporary amount of light flux is out of the dimming range, the image-signal expanding device expands the image signal by an expansion amount larger than the reciprocal.

2. The illuminator according to claim 1, the usage information being manually set.

3. The illuminator according to claim 1, further comprising:
   a brightness measuring device that measures a brightness of a usage environment, the dimming-range setting device setting the dimming range on the basis of the brightness of the usage environment.

4. The illuminator according to claim 1, further comprising:
   a gain measuring device that measures a gain of a screen, the dimming-range setting device setting the dimming range on the basis of the gain.

5. A projection display device, comprising:
   the illuminator according to claim 1;
   a light modulation device that modulates light emitted from the illuminator to form an image; and
   a projection device that projects the image.

6. The projection display device according to claim 5, the usage information being manually set.

7. The projection display device according to claim 5, further comprising a brightness measuring device that measures a brightness of a usage environment, the dimming-range setting device setting the dimming-irate range on the basis of the brightness of the usage environment.

8. The projection display device according to claim 5, further comprising a gain measuring device that measures a gain of a screen, the dimming-range setting device setting the dimming-irate range on the basis of the gain.

9. A method for driving the projection display device including:
   a light source;
   a light control device that adjusts an amount of a light flux of the light source on the basis of image information and usage information; and
   a light modulation device that modulates light emitted from the light source to form an image, the method comprising:
   setting a dimming range in which dimming is allowed on the basis of the usage information;
   adjusting the amount of the light flux of the light source within the range on the basis of image signals in unit time (during a period);
   expanding the image signals on the basis of a dimming amount of the light source and transmitting the expanded image signals to the light modulation device to form an image;

temporarily setting a temporary amount of the light flux based on the image information;
expanding the image signal by an expansion coefficient that is a reciprocal of the temporary amount of light flux, when the dimming amount of the temporary amount of light flux is within the dimming range; and
expanding the image signal by an expansion amount larger than the reciprocal, when the dimming amount of the temporary amount of light flux is out of the dimming range.

* * * * *